(12) United States Patent
Chen et al.

(10) Patent No.: US 8,051,736 B2
(45) Date of Patent: Nov. 8, 2011

(54) DEFLECTING DEVICE FOR BALL SCREW DEVICE

(75) Inventors: Yan-Yu Chen, Taichung (TW); Yu-Shan Lee, Taichung (TW)

(73) Assignee: Hiwin Technologies Corp., Situn Taichung (TW)

( * ) Notice: Subject to any disclaimer, the term of this patent is extended or adjusted under 35 U.S.C. 154(b) by 410 days.

(21) Appl. No.: 12/319,350

(22) Filed: Jan. 6, 2009

(65) Prior Publication Data

US 2010/0170360 A1    Jul. 8, 2010

(51) Int. Cl.
*F16H 1/24* (2006.01)
*F16H 55/02* (2006.01)
(52) U.S. Cl. .................... 74/424.86; 74/424.84
(58) Field of Classification Search .............. 74/424.81, 74/424.82, 424.83, 424.84, 424.86, 424.87
See application file for complete search history.

(56) References Cited

U.S. PATENT DOCUMENTS

| | | | | |
|---|---|---|---|---|
| 4,357,838 A | | 11/1982 | Blaurock et al. | 74/424.8 R |
| 4,953,419 A | * | 9/1990 | Schlenker | 74/424.86 |
| 5,063,809 A | * | 11/1991 | Schlenker | 74/424.86 |
| 6,425,302 B2 | | 7/2002 | Greubel | 74/424.87 |
| 7,523,682 B2 | * | 4/2009 | Liao et al. | 74/424.87 |
| 7,921,743 B2 | * | 4/2011 | Ohkubo et al. | 74/424.87 |
| 2004/0123691 A1 | * | 7/2004 | Hayashi | 74/424.83 |
| 2006/0027038 A1 | * | 2/2006 | Ohkubo et al. | 74/424.86 |
| 2008/0134822 A1 | * | 6/2008 | Pan et al. | 74/424.87 |
| 2010/0242651 A1 | * | 9/2010 | Shirai et al. | 74/424.83 |

* cited by examiner

*Primary Examiner* — Justin Krause
(74) *Attorney, Agent, or Firm* — Charles E. Baxley (57) ABSTRACT

A ball screw device includes a screw engaged into a nut member for forming an endless ball guiding passage between the nut member and the screw and for receiving a number of ball bearing members, the nut member includes two orifices aligned with the helical grooves of the nut member and an axial ball return channel communicating with the orifices of the nut member, a deflecting device includes two deflecting members engaged into the orifices of the nut member and each having a ball deflecting channel communicating with the helical grooves and the axial ball return channel of the nut member for increasing the strength and the working life of the deflecting device.

8 Claims, 9 Drawing Sheets

DEFLECTING DEVICE FOR BALL SCREW DEVICE

BACKGROUND OF THE INVENTION

1. Field of the Invention

The present invention relates to a deflecting device for a ball screw device, and more particularly to a deflecting device including a strength increasing structure for suitably increasing the strength of the deflecting device and for suitably increasing the working life of the deflecting device.

2. Description of the Prior Art

Typical ball screw devices comprise a nut threaded onto an elongated bolt or screw and rotatable and movable or adjustable along the screw, one or more endless ball guiding passages formed in the ball screw device for slidably receiving ball bearing members, and one or more deflecting devices attached onto the ball screw device for guiding the ball bearing members to smoothly and suitably move through the endless ball guiding passages of the ball screw device.

For example, U.S. Pat. No. 4,357,838 to Blaurock et al. discloses one of the typical ball screw and nut drive devices comprising a deflecting member engaged into a prismatic recess of a nut body for guiding the ball bearing members to smoothly move through the endless helical ball channel of the ball screw and nut drive member, and the deflecting member includes a projection for lifting balls out of the helical ball channel into the deflecting member, and includes a rectilinear part for receiving the balls from the helical ball channel, and curved part connecting the rectilinear part with the return channel.

However, the deflecting member should be precisely formed with the projection and the rectilinear part and the curved part of the deflecting member such that the manufacturing procedures and the costs will be greatly increased. In addition, the projection and the rectilinear part and the curved part of the deflecting member may have a good chance to be damaged by the ball bearing members when the ball bearing members are moved in a great speed through the helical ball channel of the typical ball screw and nut drive device.

U.S. Pat. No. 6,425,302 to Greubel discloses a further typical ball screw device comprising one or more deflecting elements attached onto the ball screw nut, and the deflecting elements each include a main deflecting-element part and a secondary deflecting-element part secured together with a retaining nose, and an open deflecting channel formed in each of the deflecting-element parts for guiding the ball bearing members to smoothly move through the endless ball guiding passage of the ball screw device.

However, similarly, the deflecting element also should be precisely formed with the deflecting-element parts and should be precisely formed with the open deflecting channels in the deflecting-element parts such that the manufacturing procedures and the costs will be greatly increased. In addition, the deflecting-element parts also may have a good chance to be damaged by the ball bearing members when the ball bearing members are moved in a great speed through the helical ball channel of the typical ball screw and nut drive device.

The present invention has arisen to mitigate and/or obviate the afore-described disadvantages of the conventional deflecting devices for the ball screw devices.

SUMMARY OF THE INVENTION

The primary objective of the present invention is to provide a deflecting device including a strength increasing structure for suitably increasing the strength of the deflecting device and for suitably increasing the working life of the deflecting device.

In accordance with one aspect of the invention, there is provided a ball screw device comprising a nut member including a screw hole formed therein and defined by a number of helical grooves, and including two orifices formed in the nut member and communicating with the helical grooves of the nut member, the orifices each formed by two side surfaces and two end seat surfaces, and the orifices being aligned with the helical grooves of the nut member, the nut member including an axial ball return channel formed therein and intersecting and communicating with the orifices of the nut member, an elongated screw engaged into the screw hole of the nut member and including a number of helical grooves for engaging with the helical grooves of the nut member and for forming an endless ball guiding passage between the nut member and the screw, a number of ball bearing members engaged in the endless ball guiding passage of the ball screw device, and a deflecting device including two deflecting members engaged into the orifices of the nut member respectively, and anchored between the side surfaces of the orifices of the nut member, the deflecting members each including a ball deflecting channel formed therein, and having a first end portion communicating with the helical grooves and the endless ball guiding passage of the nut member, and having a second end portion communicating with the axial ball return channel of the nut member for forming the endless ball guiding passage of the ball screw device and for receiving the ball bearing members.

The first end portions of the ball deflecting channels of the deflecting members are tangent to the helical grooves and the endless ball guiding passage of the nut member.

The deflecting members each include two end portions engaged with the end seat surfaces of the nut member and secured to the nut member.

The end portions of the deflecting members are secured to the nut member with fasteners. The end seat surfaces of the nut member are aligned with each other in a plan.

The deflecting members are aligned with the helical grooves of the nut member. The deflecting members each include a protrusion extended downwardly therefrom for engaging into the orifices of the nut member and for engaging into the helical grooves and the endless ball guiding passage of the nut member.

The axial ball return channel of the nut member is opened through one end portion of the nut member and intersected and communicated with the orifices of the nut member.

The nut member includes two second orifices formed in the nut member and communicating with the helical grooves of the nut member, the second orifices are each formed by two side surfaces and two end seat surfaces, and the second orifices are aligned with the helical grooves of the nut member, the nut member includes a second axial ball return channel formed therein and intersecting and communicating with the second orifices of the nut member, and two second deflecting members are engaged into the second orifices of the nut member respectively, and anchored between the side surfaces of the second orifices of the nut member, the second deflecting members each including a ball deflecting channel formed therein, and having a first end portion communicating with the helical grooves and the endless ball guiding passage of the nut member, and having a second end portion communicating with the second axial ball return channel of the nut member for receiving the ball bearing members.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-4, a ball screw device 1 in accordance with the present invention comprises an outer nut member 10 including a screw hole 11 formed therein and formed or defined by a number of helical threaded portions or grooves 12, and an elongated bolt or screw 20 engaged into the screw hole 11 of the nut member 10 and including a number of helical threaded portions or grooves 21 for threading or engaging with the helical threaded portions or grooves 12 of the nut member 10 and for allowing the nut member 10 to be rotated and moved or adjusted along the screw 20, and for forming one or more endless ball guiding passages 22 in the ball screw device 1 or between the nut member 10 and the screw 20 and for slidably receiving a number of ball bearing members 80. The coupling or threading structure or the engagement between the nut member 10 and the screw 20 is typical and will not be described in further details.

Figure 5:
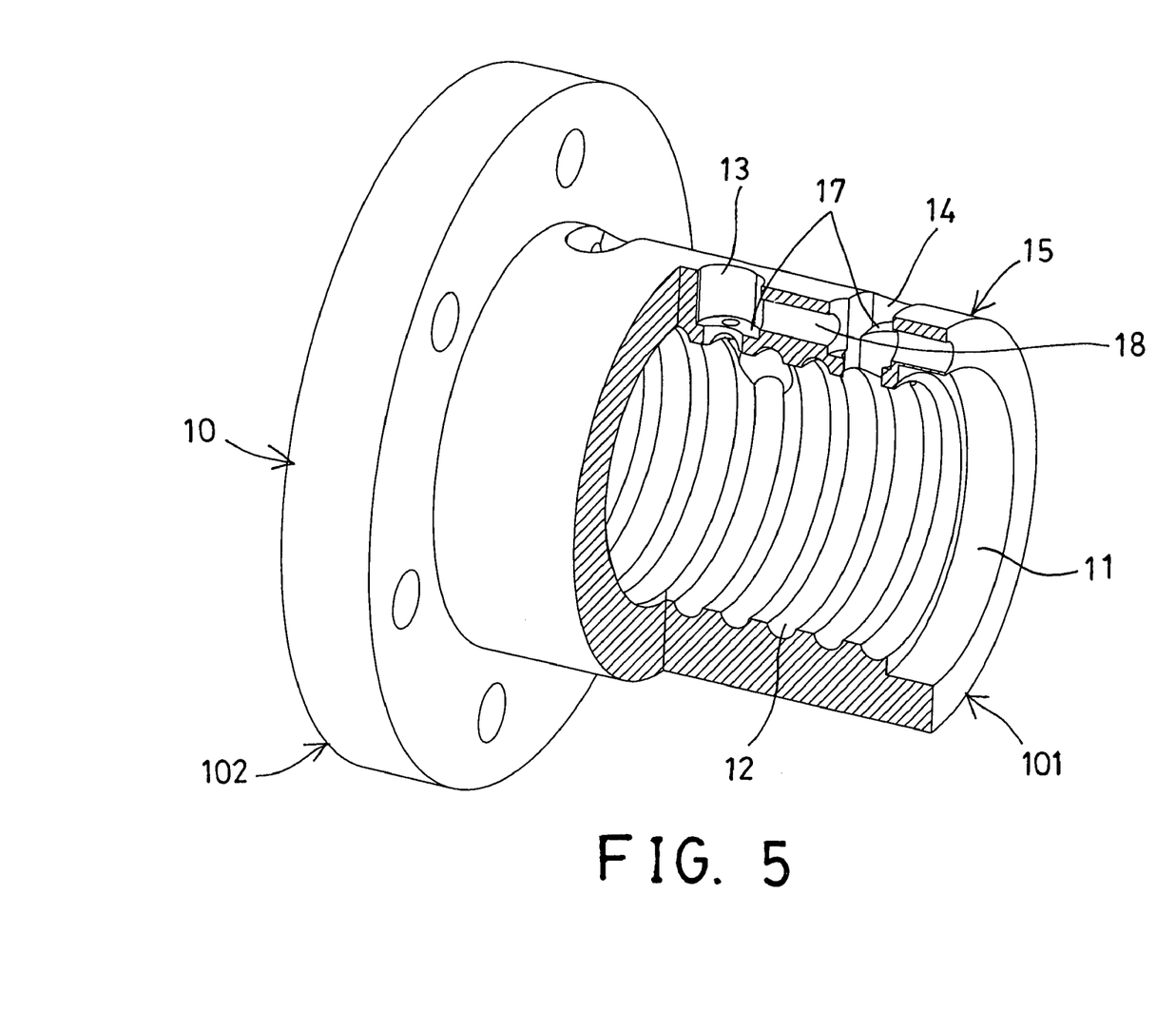
FIG. 5 is a still further perspective view of the outer nut member, in which the outer nut member has been removed for illustrating the inner structure of the outer nut member.
Figure 6:
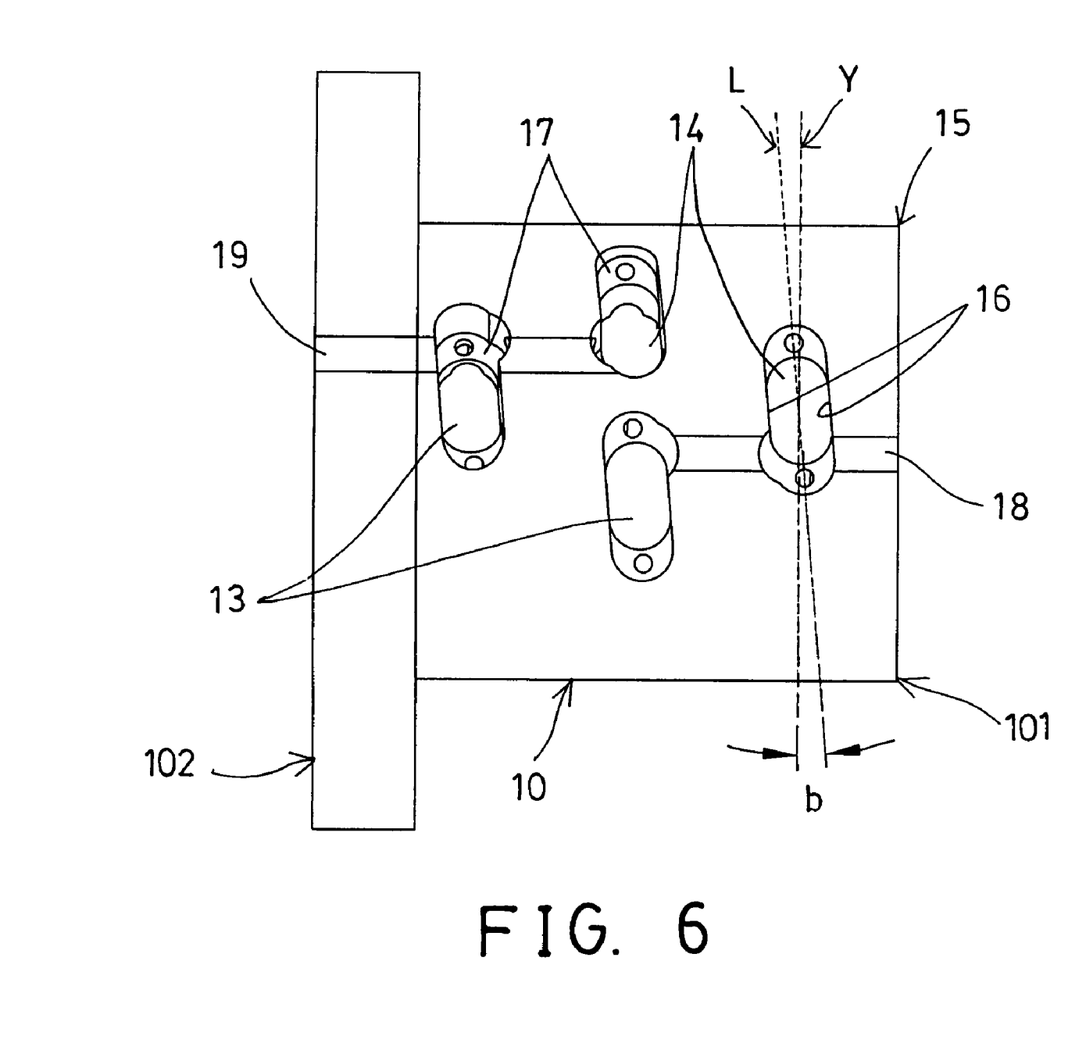
FIG. 6 is a side plan schematic view of the outer nut member for attaching the deflecting device.
Figure 9:
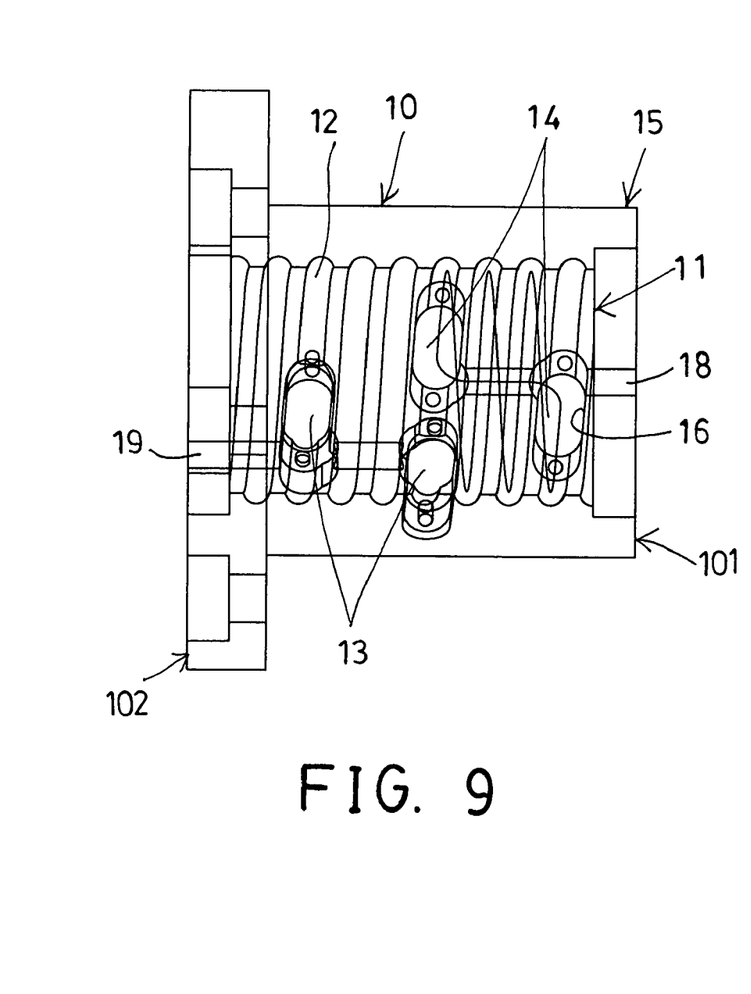
FIGS. 9, 10 are cross sectional views of the outer nut member illustrating the arrangement of the outer longitudinal orifices relative to the helical threaded portions or grooves of the nut member.
Figure 10:
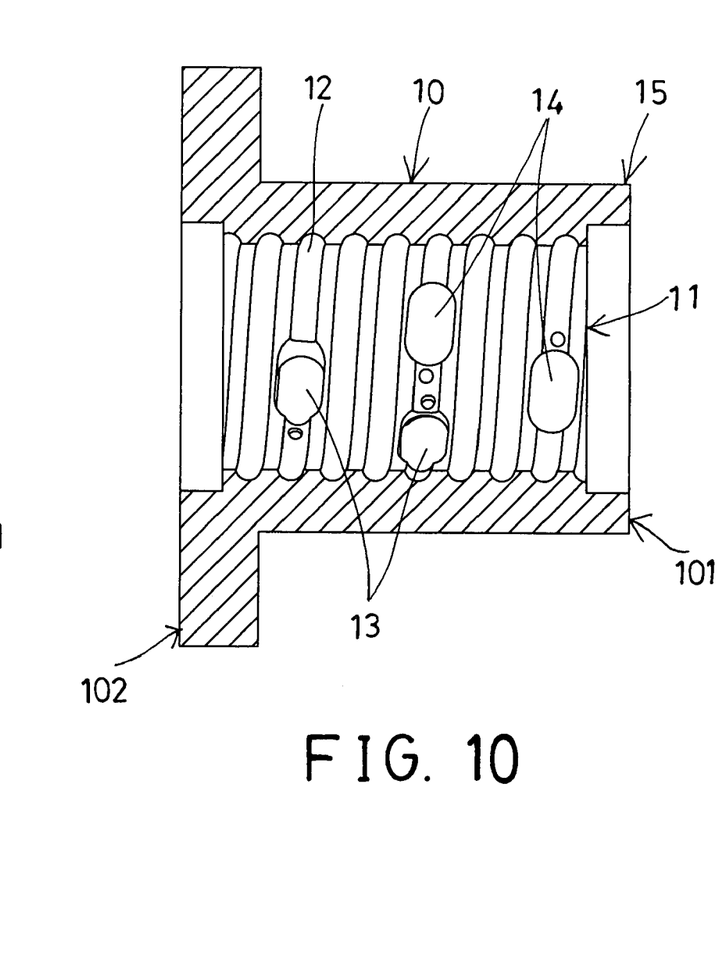

The nut member 10 includes two pairs or four longitudinal orifices 13, 14 formed therein, such as formed in the outer peripheral portion 15 thereof and communicating with the helical grooves 12 and/or the endless ball guiding passages 22 of the nut member 10 (FIG. 5), and each formed or defined by two flat side surfaces 16 (FIG. 6) and two end shoulders or seat plans or surfaces 17 (FIGS. 5, 6), in which the seat surfaces 17 in each orifice 13, 14 of the nut member 10 are aligned with each other in the same plan (FIG. 6), and the orifices 13, 14 of the nut member 10 are longitudinal and each include a longitudinal direction or axis "L" aligned with the helical grooves 12 and/or the endless ball guiding passages 22 of the nut member 10, best shown in FIGS. 6, and 9-10, and the longitudinal axis "L" of the orifices 13, 14 of the nut member 10 are tilted or inclined relative to the radial direction or Y-axis of the nut member 10 (FIG. 6) for forming an included angle "b" between the longitudinal axis "L" of the orifices 13, 14 of the nut member 10 and the radial direction or Y-axis of the nut member 10, and the included angle "b" is substantially equals to the helical angle of the helical grooves 12 and/or the endless ball guiding passages 22 of the nut member 10.

Figure 7:
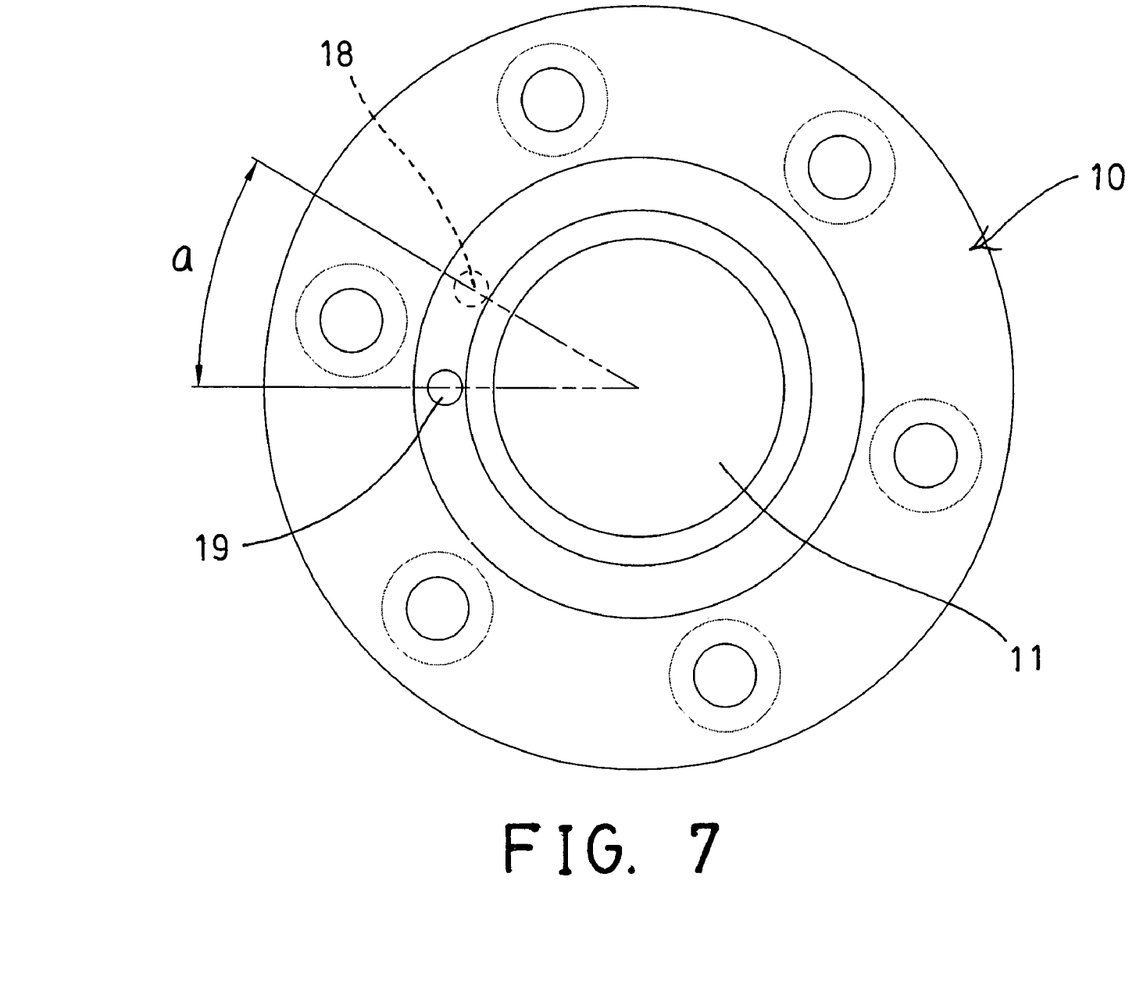
FIG. 7 is an end plan schematic view of the outer nut member.

The nut member 10 further includes an axial ball return channel 18, 19 formed therein and intersecting or communicating with the pair of orifices 13, 14, also best shown in FIG. 6. As shown in FIGS. 1-2 and 4-6, the axial ball return channel 18 for one pair of the orifices 13, 14 is extended or opened through one end portion 101 of the nut member 10 and intersected or communicated with the pair of orifices 13, 14 for allowing the axial ball return channel 18 to be easily drilled or formed through the nut member 10, and the other axial ball return channel 19 for the other pair of the orifices 13, 14 is extended or opened through the other end portion 102 of the nut member 10 and intersected or communicated with the other pair of orifices 13, 14 for allowing the axial ball return channel 19 also to be easily drilled or formed through the nut member 10. It is preferable that the two axial ball return channels 18, 19 are offset from each other or include an included angle "a", such as an acute angle "a" formed between the two axial ball return channels 18, 19 (FIG. 7) for preventing the strength of the nut member 10 from being decreased or affected.

Figure 1:
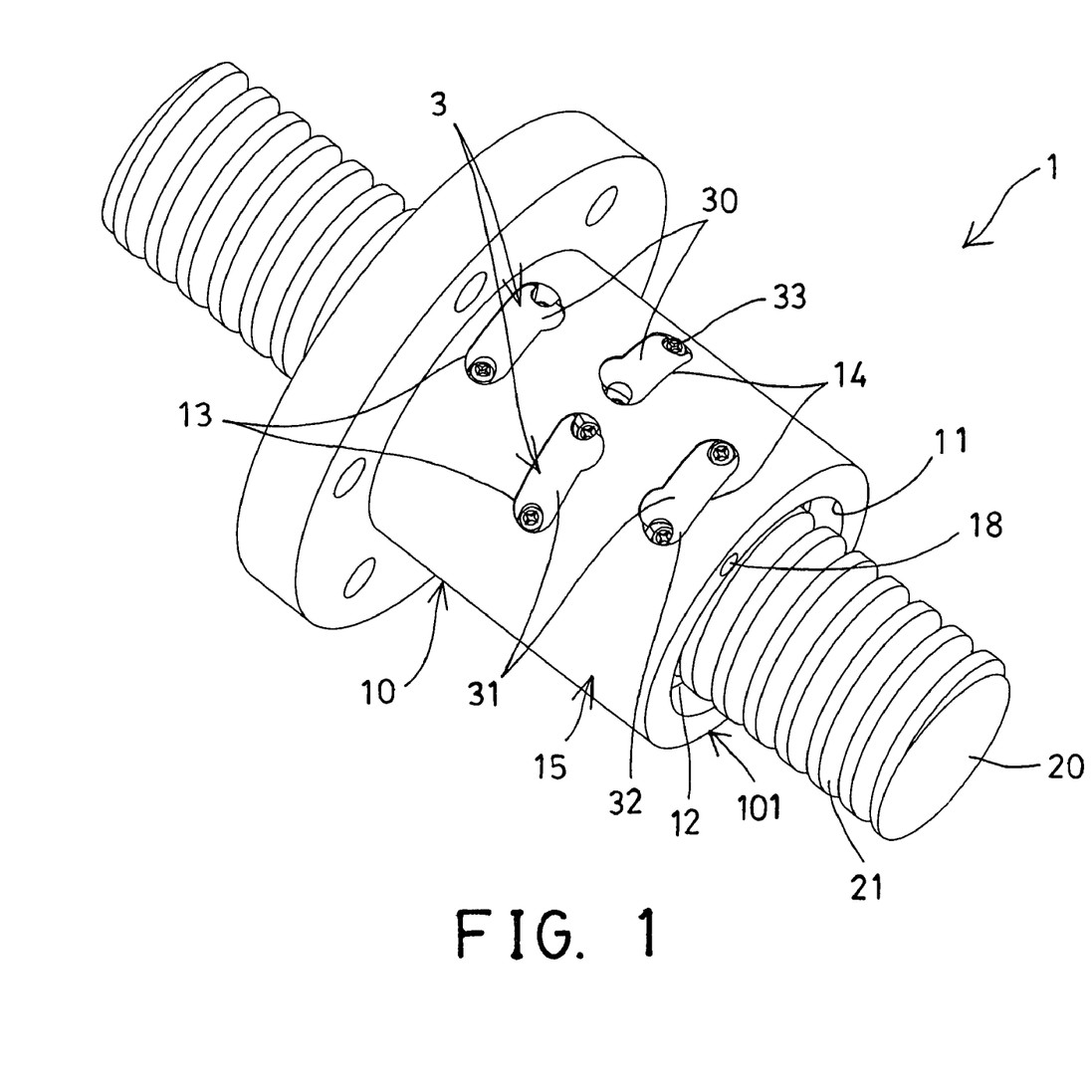
FIG. 1 is a perspective view of a ball screw device including a deflecting device in accordance with the present invention.
Figure 2:
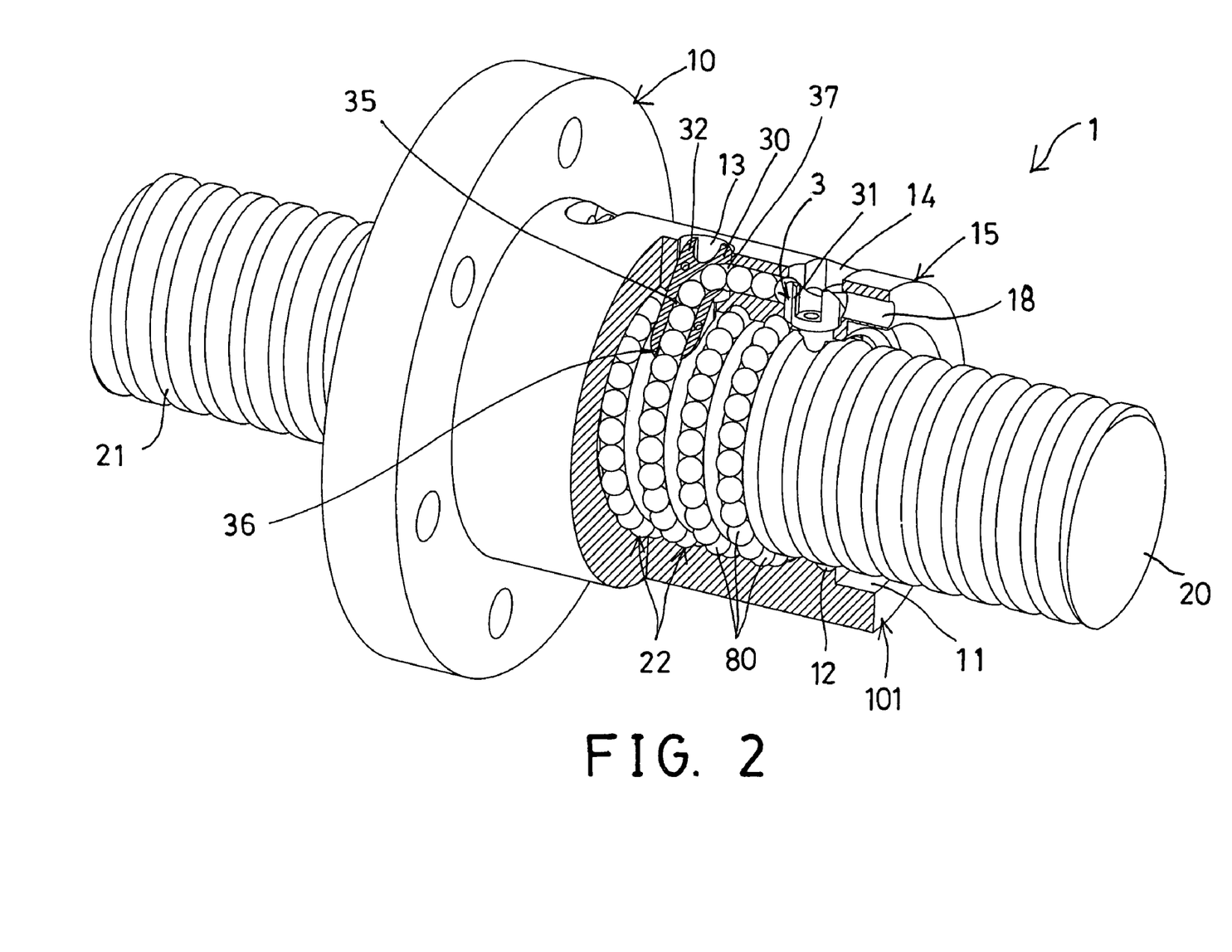
FIG. 2 is another perspective view of the ball screw device, in which a portion of the outer nut member has been cut off for illustrating the inner structure of the ball screw device.

One or more (such as two) deflecting devices 3 each include two elongated deflecting members 30, 31 for engaging into the pair of orifices 13, 14 of the nut member 10 respectively, and anchored and positioned between the side surfaces 16 of the nut member 10, and the deflecting members 30, 31 are also aligned with the helical grooves 12 and/or the endless ball guiding passages 22 of the nut member 10, and each include two end portions 32 stably engaged with the seat surfaces 17 of the nut member 10 and secured to the nut member 10 with latches or fasteners 33 (FIG. 1), and each include a protrusion 34 extended outwardly or downwardly from the central portion of the deflecting member 30, 31 for deeply engaging into the pair of orifices 13, 14 of the nut member 10 respectively and for engaging into the helical grooves 12 and/or the endless ball guiding passages 22 of the nut member 10 (FIGS. 2-4), and each include a ball deflecting channel 35 formed therein (FIG. 2).

Figure 3:
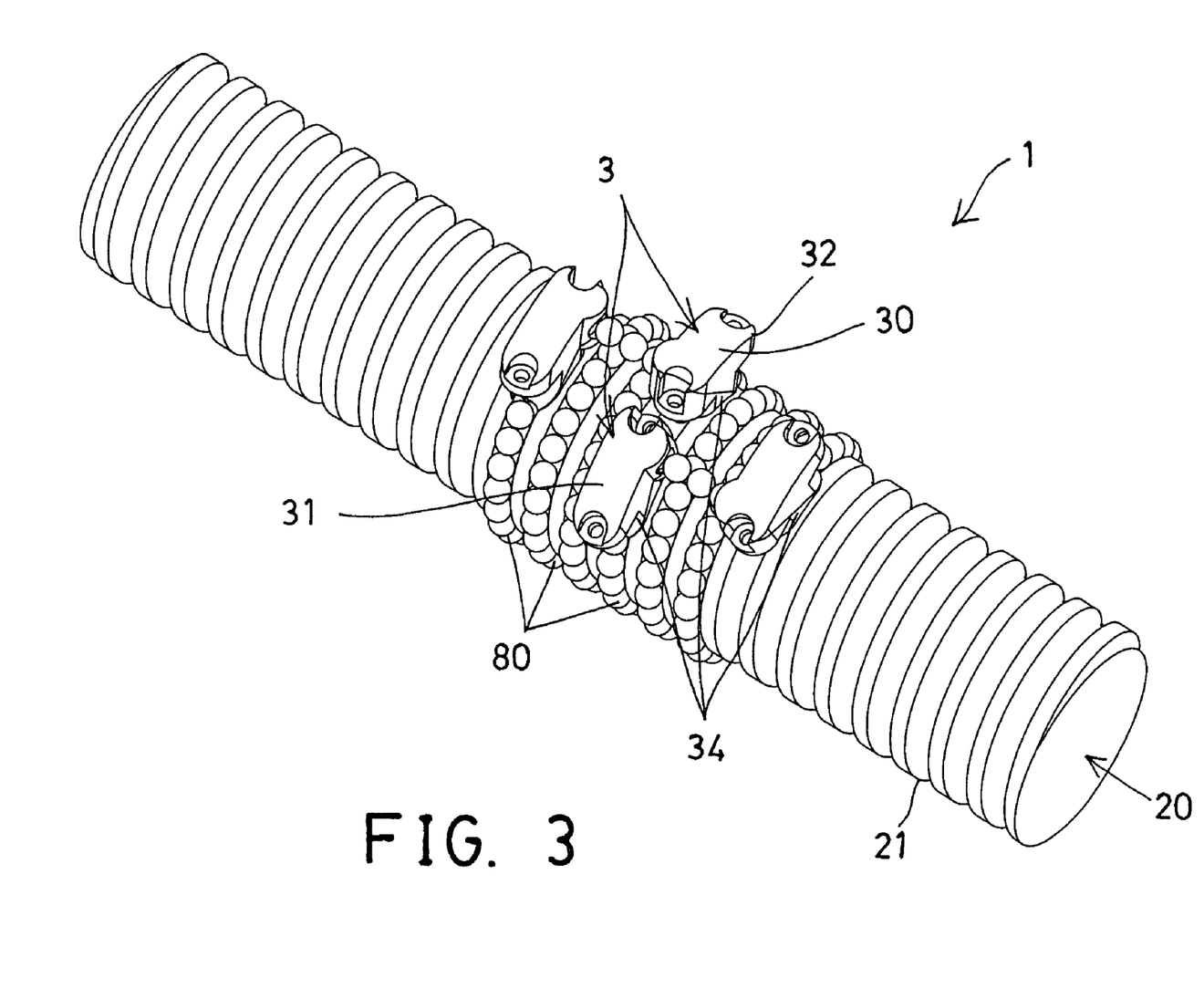
FIG. 3 is a further perspective view of the ball screw device, in which the outer nut member has been removed for further illustrating the inner structure of the ball screw device.
Figure 4:
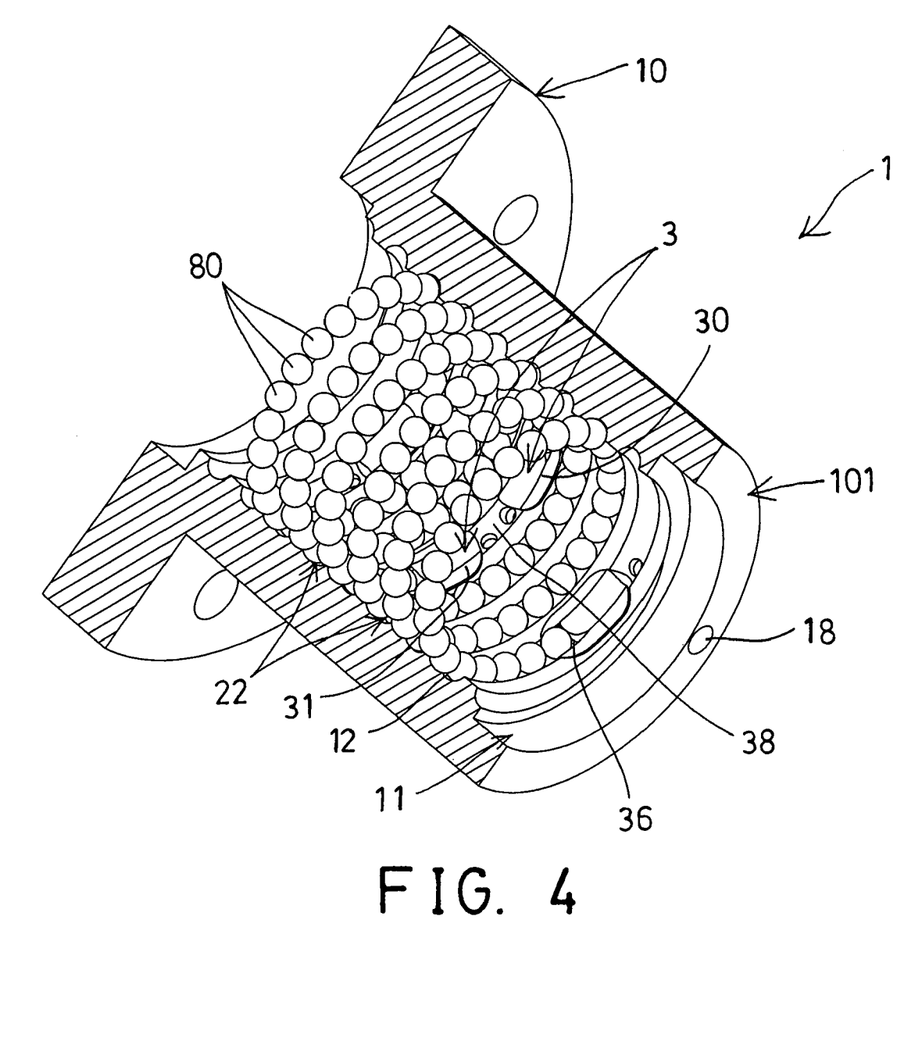
FIG. 4 is a still further perspective view of the ball screw device, in which the central elongated-bolt or screw has been removed, and a portion of the outer nut member has been cut off for further illustrating the inner structure of the ball screw device.

As best shown in FIGS. 2-4, the ball deflecting channel 35 of each deflecting member 30, 31 includes one end portion 36 aligned with or communicating with the helical grooves 12 and/or the endless ball guiding passages 22 of the nut member 10 and tangent to the helical grooves 12 and/or the endless ball guiding passages 22 of the nut member 10 for suitably guiding or sending or transmitting or receiving the ball bearing members 80, and the other end portion 37 aligned with or communicating with the axial ball return channel 18, 19 for forming the endless ball guiding passages 22 of the ball screw device 1 and for guiding or sending or transmitting or receiving the ball bearing members 80 and for allowing the ball bearing members 80 to smoothly move through the helical grooves 12 and/or the endless ball guiding passages 22 and the axial ball return channel 18, 19 of the ball screw device 1 and through the ball deflecting channels 35 of the deflecting members 30, 31 of the deflecting devices 3.

Figure 8:
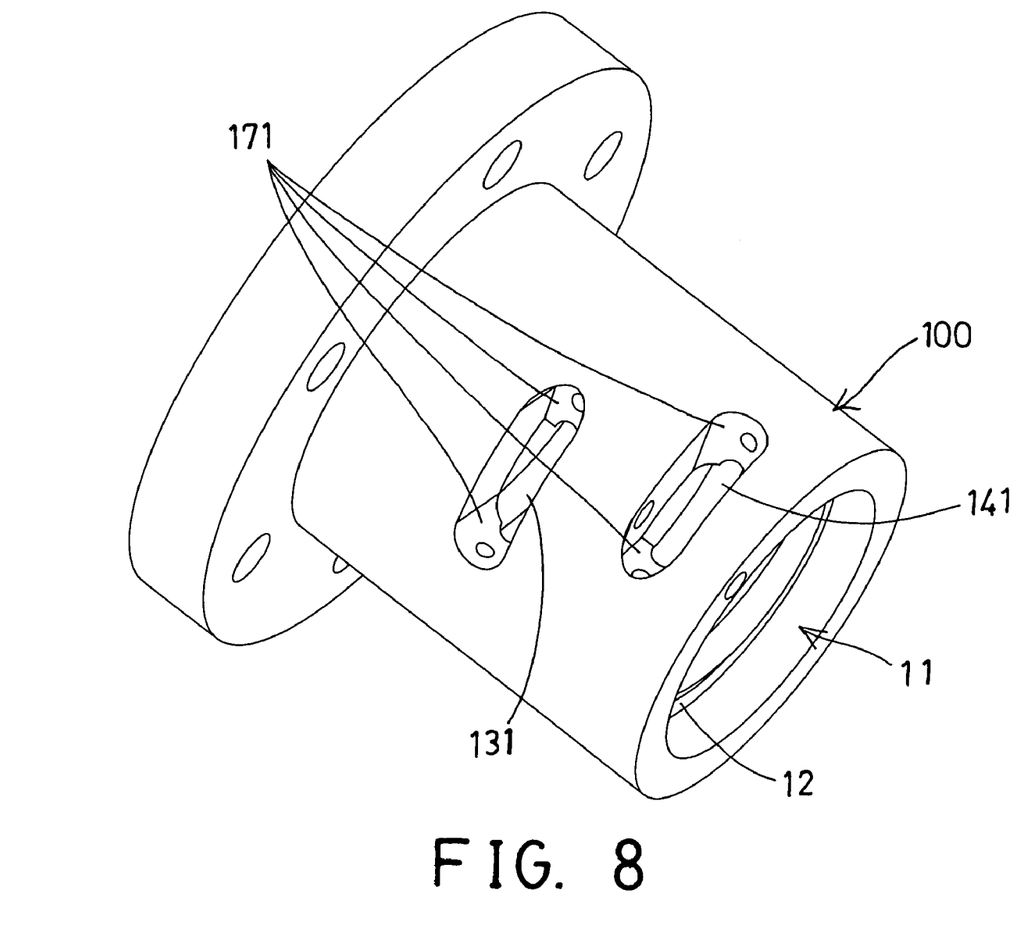
FIG. 8 is a still further perspective view of the outer nut member illustrating the other arrangement of the outer nut member for attaching the deflecting device.

As shown in FIG. 4, a gap or space 38 may be formed between the deflecting members 30, 31 of the two different deflecting devices 3, for preventing the orifices 13, 14 of the two different deflecting devices 3 from being formed closer to each other and for preventing the strength of the deflecting members 30, 31 from being decreased or affected. In addition, a greater number of the ball bearing members 80 may be received or engaged into the endless ball guiding passages 22 of the nut member 10 and may be stably engaged between the nut member 10 and the screw 20 for allowing the nut member 10 to be stably and slidably attached onto the screw 20. Alternatively, as shown in FIG. 8, the seat surfaces 171 of the nut member 100 may be tilted relative to each other, but not aligned with each other nor in the same plan such that the length of the orifices 131, 141 of the nut member 100 may be relatively increased and such that the deflecting members 30, 31 may be stably attached and anchored or secured to the nut member 100.

In operation, as shown in FIGS. 2-4, the deflecting members 30, 31 may be engaged into the orifices 13, 14 of the nut member 10 respectively and anchored between the side surfaces 16 of the nut member 10, and the deflecting members 30, 31 each include two end portions 32 engaged with the seat surfaces 17 and secured to the nut member 10 with latches or fasteners 33 (FIG. 1), and each include a protrusion 34 for engaging into the orifices 13, 14 of the nut member 10 and the helical grooves 12 and/or the endless ball guiding passages 22 of the nut member 10 and for allowing the deflecting members 30, 31 to be stably anchored or secured or retained to the nut member 10. In addition, the deflecting members 30, 31 are aligned with the helical grooves 12 and/or the endless ball guiding passages 22 of the nut member 10, and the one end portion 36 of the ball deflecting channel 35 of the deflecting member 30, 31 is tangent to the helical grooves 12 and/or the endless ball guiding passages 22 of the nut member 10 for smoothly guiding or sending or transmitting or receiving the ball bearing members 80.

Accordingly, the deflecting device in accordance with the present invention includes a strength increasing structure for suitably increasing the strength of the deflecting device and for suitably increasing the working life of the deflecting device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
   a nut member including a screw hole formed therein and defined by a helical groove, and including two first longitudinal orifices and two second longitudinal orifices formed in said nut member and communicating with said helical groove of said nut member, and said first and said second orifices of said nut member including a longitudinal axis aligned with said helical groove of said nut member and inclined relative to a radial axis of said nut member, said nut member including a first axial ball return channel formed therein and opened through a first end portion of said nut member and intersecting and communicating with said first orifices of said nut member, and including a second axial ball return channel formed therein and opened through a second end portion of said nut member and intersecting and communicating with said second orifices of said nut member, and including an acute angle formed between said first axial ball return channel and said second axial ball return channel of said nut member,
   an elongated screw engaged into said screw hole of said nut member and including a helical groove for engaging with said helical groove of said nut member and for forming a first endless ball guiding passage and a second endless ball guiding passage between said nut member and said screw,
   a plurality of ball bearing members engaged in said first and said second endless ball guiding passages of said ball screw device, and
   a deflecting device including two first deflecting members, one of said two first deflecting members being engaged into each of said first orifices of said nut member respectively, said first deflecting members each including a ball deflecting channel formed therein, and said ball deflecting channels of said first deflecting members each including a first end portion communicating with said helical groove and said first endless ball guiding passage of said nut member, and each including a second end portion communicating with said first axial ball return channel of said nut member for forming said first endless ball guiding passage of said ball screw device and for receiving said ball bearing members, and said deflecting device including two second deflecting members, one of said two second deflecting members being engaged into each of said second orifices of said nut member respectively, said second deflecting members each including a ball deflecting channel formed therein, and said ball deflecting channels of said second deflecting members each including a first end portion communicating with said helical groove and said second endless ball guiding passage of said nut member, and each including a second end portion communicating with said second axial ball return channel of said nut member for forming said second endless ball guiding passage of said ball screw device and for receiving said ball bearing members.

2. The ball screw device as claimed in claim 1, wherein said nut member includes an included angle formed between said longitudinal axis of said first and said second orifices of said nut member and said radial axis of said nut member and equal to a helical angle of said helical groove and said first and said second endless ball guiding passages of said nut member.

3. The ball screw device as claimed in claim 1, wherein said first end portions of said ball deflecting channels of said first and said second deflecting members are tangent to said helical groove and said first and said second endless ball guiding passages of said nut member.

4. The ball screw device as claimed in claim 1, wherein said first and said second orifices of said nut member are each formed by two side surfaces and two end seat surfaces, said first and said second deflecting members each include two end portions engaged with said end seat surfaces of said nut member and secured to said nut member.

5. The ball screw device as claimed in claim 4, wherein said first and said second deflecting members are anchored between said side surfaces of said first and said second orifices of said nut member, said end portions of said first and said second deflecting members are secured to said nut member with fasteners.

6. The ball screw device as claimed in claim 4, wherein said end seat surfaces of said nut member are aligned with each other.

7. The ball screw device as claimed in claim 1, wherein said first and said second deflecting members are aligned with said helical groove of said nut member.

8. The ball screw device as claimed in claim 1, wherein said first and said second deflecting members each include a protrusion extended radially inward for engaging into said first and said second orifices of said nut member and for engaging into said helical groove and said first and said second endless ball guiding passages of said nut member.

* * * * *